United States Patent
Dhamija et al.

(10) Patent No.: US 11,995,672 B2
(45) Date of Patent: May 28, 2024

(54) SYSTEM AND METHOD FOR INTERACTIVE OFFER REDEMPTION

(71) Applicant: Visa International Service Association, San Francisco, CA (US)

(72) Inventors: Dheeraj Dhamija, Bangalore (IN); Ishan Tiwary, Bangalore (IN)

(73) Assignee: Visa International Service Association, San Francisco, CA (US)

(*) Notice: Subject to any disclaimer, the term of this patent is extended or adjusted under 35 U.S.C. 154(b) by 229 days.

(21) Appl. No.: 16/989,984

(22) Filed: Aug. 11, 2020

(65) Prior Publication Data

US 2022/0051277 A1 Feb. 17, 2022

(51) Int. Cl.
*G06Q 30/0207* (2023.01)
*G06Q 30/0226* (2023.01)

(52) U.S. Cl.
CPC ..... *G06Q 30/0209* (2013.01); *G06Q 30/0222* (2013.01); *G06Q 30/0232* (2013.01)

(58) Field of Classification Search
None
See application file for complete search history.

(56) References Cited

U.S. PATENT DOCUMENTS

| | | | | |
|---|---|---|---|---|
| 2006/0248025 A1* | 11/2006 | Walker | ............... | G07F 17/3232 705/400 |
| 2008/0026816 A1* | 1/2008 | Sammon | ............... | G07F 17/32 463/20 |
| 2013/0331175 A1* | 12/2013 | Mayeroff | ............ | G07F 17/3255 463/25 |
| 2018/0061180 A1* | 3/2018 | Gambhir | ............ | G07F 17/3218 |
| 2018/0240304 A1* | 8/2018 | Blatstein | ............ | G06Q 30/0238 |
| 2019/0206180 A1* | 7/2019 | Cage | ............... | G06Q 30/0209 |

OTHER PUBLICATIONS

Susskind, Alex: "The Food-Service Industry: Best of Times, Worst of Times"—available at: https://ecommons.cornell.edu/items/95e35b87-721c-4cbd-b761-47e63029832f (Year: 2017).*

* cited by examiner

*Primary Examiner* — Katherine Kolosowski-Gager
(74) *Attorney, Agent, or Firm* — The Webb Law Firm

(57) ABSTRACT

The present disclosure relates to an offer redemption method and system. The offer redemption method includes receiving a user interactive value corresponding to a user interaction level with an external game device; receiving a transaction amount corresponding to a transaction amount made by a user with a merchant; determining an offer value corresponding to the user interaction value, transmitting an authorization request message for receiving authorization response from an authorizing entity, receiving an authorization response for the transmitted authorization request message; and displaying the authorization response and an offer redemption status on a display module of the access device.

14 Claims, 4 Drawing Sheets

200

| Interaction Name | Interaction level | Loyalty program rules |
|---|---|---|
| Hammer game | 0 | No offer |
| | 1 - 5 | 2% off on selected merchandise |
| | 6 - 10 | 5% off om selected merchandise |
| | 11 - 15 | 10% off on selected merchandise |
| | 16 – 20 | 25% off on selected merchants/merchandise |
| Bowling game | 0 | No offer |
| | Bowl strike option 1 | 2% off on selected merchandise |
| | Bowl strike option 2 | 5% off on selected merchandise |
| | Bowl strike option 3 | 10% off on selected merchandise |
| | Bowl strike option 4 | 25% off on selected merchandise |

FIG. 2

SYSTEM AND METHOD FOR INTERACTIVE OFFER REDEMPTION

BACKGROUND

1. Technical Field

The present disclosure relates to offer redemption. Specifically, the disclosure relates to real-time interactive offer redemption at a merchant location.

2. Technical Considerations

Loyalty programs are structured marketing strategies designed to encourage customers to shop or use services of merchants associated with the loyalty program. Loyalty programs are generally designed by merchants either independently or co-branded with other businesses including issuers, card network providers and the like. Generally, to be part of the loyalty program, the customers have to own a special card or have an existing card that is linked to the loyalty program. By presenting such a card, the customers receive a discount on a purchase or can redeem one or more offers for purchases made with the merchant.

The customer can typically be part of a loyalty program by taking part in one or more activities set by the merchants based on one or more rules. These rules include but are not limited to shopping until a threshold limit set by the merchant, shopping within a given time-window, and participating in one or more activities organized by the merchant. Since the loyalty programs boost customer engagement and increase the share of wallet for the merchant, it is crucial for the merchants to provide improved and effective ways to enroll and engage the customer in the loyalty program.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to some non-limiting embodiments or aspects, provided is a computer-implemented method comprising: receiving, by a connected accessory kit, a user interaction value corresponding to a user interaction level with an external game device; receiving, by an access device, a transaction amount corresponding to a transaction amount made by a user with a merchant; determining, by the access device, an offer value corresponding to the user interaction value, by mapping the user interaction value with the transaction amount made by the user with the merchant; transmitting, by the access device, an authorization request message for receiving an response from an authorizing entity; receiving, by the access device, the authorization response for the authorization request message; and displaying, by the access device, the authorization response and an offer redemption status on a display module of the access device.

In some non-limiting embodiments or aspects, the connected accessory kit is a standalone device interfacing with the access device. In some non-limiting embodiments or aspects, the connected accessory kit is a built-in module of the access device. In some non-limiting embodiments or aspects, the connected accessory kit is configured to receive the user interaction value from an external game device, and the external game device is configured to capture a user interaction level based on one or more sensor data received from one or more sensors embedded on the external game device. In some non-limiting embodiments or aspects, the offer value is configured by the access device of the merchant, and the offer value is determined based on one or more factors comprising at least one of the following: user type, portable device type, eligibility criteria, interaction level rules, or any combination thereof.

In some non-limiting embodiments or aspects, the access device is configured to display an offer value corresponding to the user interaction level after the user has interacted with the external game device. In some non-limiting embodiments or aspects, the access device is configured to transmit the offer value as a part of the authorization request message. In some non-limiting embodiments or aspects, the connected accessory kit is configured to store the user interaction value and transmit the user interaction value to the access device when the access device receives the transaction amount. In some non-limiting embodiments or aspects, the access device is configured to obtain a last stored user interaction value and append the user interaction value in the authorization request message. In some non-limiting embodiments or aspects, the authorization response message comprises at least an authorization status of the transaction and an offer redemption status corresponding to the offer value.

According to some non-limiting embodiments or aspects, provided is an interactive offer redemption system comprising: one or more processors; and one or more computer-readable media, communicatively coupled to the one or more processors storing instructions, which upon execution causes the one or more processors to: receive a user interaction value corresponding to a user interaction level with an external game device; receive a transaction amount corresponding to a transaction amount made by a user with a merchant; determine an offer value corresponding to the user interaction value, by mapping the user interaction value with the transaction amount made by the user with the merchant; transmit an authorization request message for receiving an authorization response from an authorizing entity; receive the authorization response for the authorization request message; and display the authorization response on a display module of an access device.

In some non-limiting embodiments or aspects, the one or more processors comprises at least one processor for a connected accessory kit and for the access device, and the connected accessory kit is a standalone device interfacing with the access device. In some non-limiting embodiments or aspects, the one or more processors comprises at least one processor for a connected accessory kit and for the access device, and wherein the connected accessory kit is a built-in module of the access device. In some non-limiting embodiments or aspects, the one or more processors are configured to receive the user interaction value from an external game device, and the external game device is configured to capture a user interaction level based on or more sensor data received from one or more sensors embedded on the external game device. In some non-limiting embodiments or aspects, the offer value is configured by the access device of the merchant, wherein the offer value is determined based on one or more factors comprising at least one of the following: user type, portable device type, eligibility criteria, interaction level rules, or any combination thereof.

In some non-limiting embodiments or aspects, the access device is configured to display an offer value corresponding to the user interaction level after the user has interacted with the external game device. In some non-limiting embodiments or aspects, the access device is configured to transmit the offer value as a part of the authorization request message. In some non-limiting embodiments or aspects, a connected accessory kit is configured to store the user interaction value initially and then transmit it to the access device at a time when the access device receives the transaction amount. In some non-limiting embodiments or aspects, the access device is configured to obtain the stored user interaction value and append the user interaction value in the authorization request message. In some non-limiting embodiments or aspects, the authorization response message comprises at least an authorization status of the transaction and an offer redemption status corresponding to the determined offer value.

Further non-limiting embodiments or aspects are set forth in the following numbered clauses:

Clause 1: A computer-implemented method comprising: receiving, by a connected accessory kit, a user interaction value corresponding to a user interaction level with an external game device; receiving, by an access device, a transaction amount corresponding to a transaction amount made by a user with a merchant; determining, by the access device, an offer value corresponding to the user interaction value, by mapping the user interaction value with the transaction amount made by the user with the merchant; transmitting, by the access device, an authorization request message for receiving an response from an authorizing entity; receiving, by the access device, the authorization response for the authorization request message; and displaying, by the access device, the authorization response and an offer redemption status on a display module of the access device.

Clause 2: The method of clause 1, wherein the connected accessory kit is a standalone device interfacing with the access device.

Clause 3: The method of clause 1 or 2, wherein the connected accessory kit is a built-in module of the access device.

Clause 4: The method of any of clauses 1-3, wherein the connected accessory kit is configured to receive the user interaction value from an external game device, wherein the external game device is configured to capture a user interaction level based on one or more sensor data received from one or more sensors embedded on the external game device.

Clause 5: The method of any of clauses 1-4, wherein the offer value is configured by the access device of the merchant, and wherein the offer value is determined based on one or more factors comprising at least one of the following: user type, portable device type, eligibility criteria, interaction level rules, or any combination thereof.

Clause 6: The method of any of clauses 1-5, wherein the access device is configured to display an offer value corresponding to the user interaction level after the user has interacted with the external game device.

Clause 7: The method of any of clauses 1-6, wherein the access device is configured to transmit the offer value as a part of the authorization request message.

Clause 8: The method of any of clauses 1-7, wherein the connected accessory kit is configured to store the user interaction value and transmit the user interaction value to the access device when the access device receives the transaction amount.

Clause 9: The method of any of clauses 1-8, wherein the access device is configured to obtain a last stored user interaction value and append the user interaction value in the authorization request message.

Clause 10: The method of any of clauses 1-9, wherein the authorization response message comprises at least an authorization status of the transaction and an offer redemption status corresponding to the offer value.

Clause 11: An interactive offer redemption system comprising: one or more processors; and one or more computer-readable media, communicatively coupled to the one or more processors storing instructions, which upon execution causes the one or more processors to: receive a user interaction value corresponding to a user interaction level with an external game device; receive a transaction amount corresponding to a transaction amount made by a user with a merchant; determine an offer value corresponding to the user interaction value, by mapping the user interaction value with the transaction amount made by the user with the merchant; transmit an authorization request message for receiving an authorization response from an authorizing entity; receive the authorization response for the authorization request message; and display the authorization response on a display module of an access device.

Clause 12: The system of clause 11, wherein the one or more processors comprises at least one processor for a connected accessory kit and for the access device, and wherein the connected accessory kit is a standalone device interfacing with the access device.

Clause 13: The system of clause 11 or 12, wherein the one or more processors comprises at least one processor for a connected accessory kit and for the access device, and wherein the connected accessory kit is a built-in module of the access device.

Clause 14: The system of any of clauses 11-13, wherein the one or more processors are configured to receive the user interaction value from an external game device, wherein the external game device is configured to capture a user interaction level based on or more sensor data received from one or more sensors embedded on the external game device.

Clause 15: The system of any of clauses 11-14, wherein the offer value is configured by the access device of the merchant, wherein the offer value is determined based on one or more factors comprising at least one of the following: user type, portable device type, eligibility criteria, interaction level rules, or any combination thereof.

Clause 16: The system of any of clauses 11-15, wherein the access device is configured to display an offer value corresponding to the user interaction level after the user has interacted with the external game device.

Clause 17: The system of any of clauses 11-16, wherein the access device is configured to transmit the offer value as a part of the authorization request message.

Clause 18: The system of any of clauses 11-17, wherein a connected accessory kit is configured to store the user interaction value initially and then transmit it to the access device at a time when the access device receives the transaction amount.

Clause 19: The system of any of clauses 11-18, wherein the access device is configured to obtain the stored user interaction value and append the user interaction value in the authorization request message.

Clause 20: The system of any of clauses 11-19, wherein the authorization response message comprises at least an authorization status of the transaction and an offer redemption status corresponding to the determined offer value.

BRIEF DESCRIPTION OF THE DRAWINGS

The example embodiments or aspects of the present disclosure are illustrated by way of example, and not in way by limitation, in the figures of the accompanying drawings and in which like reference numerals refer to similar elements and in which:

FIG. 2 is a table illustrating offer configuration in a connected accessory kit, in accordance with some non-limiting embodiments or aspects;

Figure 1:
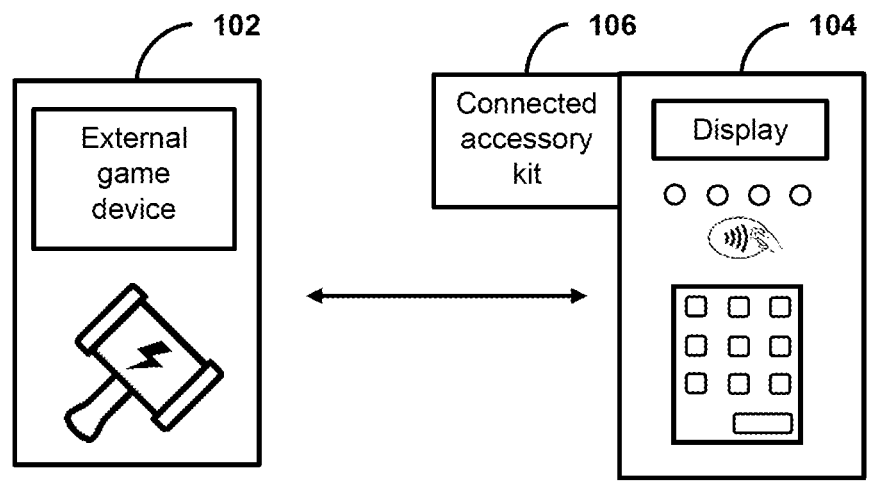
FIG. 1 is a block diagram of a system for interactive offer redemption using an access device, in accordance with some non-limiting embodiments or aspects.

While each of the figures illustrates a particular embodiment for purposes of illustrating a clear example, some non-limiting embodiments or aspects may omit, add to, reorder, and/or modify any of the elements shown in the figures.

DETAILED DESCRIPTION

In the following description, for the purposes of explanation, numerous specific details are set forth in order to provide a thorough understanding of the example embodiments or aspects of the present disclosure. It will be apparent, however, that the example embodiments or aspects may be practiced without these specific details. In other instances, well-known structures and devices are shown in block diagram form in order to avoid unnecessarily obscuring the example embodiments or aspects.

As an initial matter, some terms can be described in further detail.

An "access device" may be any suitable device that provides access to a remote system. An access device may also be used for communicating with a portable device, a network computer, an authorizing entity computer, or any other suitable system. An access device may generally be located in any suitable location, such as at the location of a merchant. An access device may be in any suitable form. Some examples of access devices include point of sale (POS) devices (e.g., POS terminals), cellular phones, personal digital assistants (PDAs), personal computers (PCs), tablet PCs, handheld specialized readers, set-top boxes, electronic cash registers (ECRs), automated teller machines (ATMs), virtual cash registers (VCRs), kiosks, security systems, access systems, wearable devices, internet of things (IOT) devices, and the like. In some non-limiting embodiments or aspects, an access device can be a device that acts as an access device at a gas station or other location. In some non-limiting embodiments or aspects, where an access device may comprise a POS terminal, any suitable POS terminal may be used and may comprise a reader, a processor, and a computer-readable medium. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

A "portable device" may comprise any suitable electronic device that may be operated by a user, which may also provide remote communication capabilities to a network of remote communication capabilities include using a mobile phone (wireless) network, wireless data network (e.g., 3G, 4G, or similar networks), Wi-Fi®, Wi-Max™, or any other communication medium that may provide access to a network such as the Internet or a private network. Examples of portable devices are mobile phones (e.g., cellular phones), PDAs, tablet computers, notebooks, laptop computers, personal music players, hand-held specialized readers, etc. Further examples of portable devices are wearable devices, such as smart watches, fitness bands, ankle bracelets, rings, earrings, etc., as well as automobiles with remote communication capabilities. In some non-limiting embodiments or aspects, a portable device can function as a payment device (e.g., a portable device can store and be able to transmit payment credentials for a transaction). A "portable consumer device" may be an example of a "portable device." A portable consumer device may refer to any instrument that enables the user to make payments to a merchant. The portable consumer device may be a static instrument which provides user credentials for enabling the transactions. The portable consumer device may also be referred as a payment instrument. A credit card, a debit card, a prepaid card and a gift card may be examples of the payment instruments.

"Transaction data" may refer to information associated with a transaction. For example, transaction data may comprise one or more of an authorized amount (e.g., transaction amount, item value, etc.), other amount, terminal country code, terminal verification results, transaction currency code, transaction date, transaction type (e.g., card-present transaction, card-not-present transaction, high value transaction, low value transaction, local transaction, international transaction, etc.), an unpredictable number, application interchange profile (AIP), application transaction counter (ATC), issuer application data (IAD), etc.

A "user" may include an individual. In some non-limiting embodiments or aspects, a user may be associated with one or more personal accounts and/or portable devices. The user may also be referred to as a cardholder, account holder, consumer or a consumer.

"Credentials" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a sub token, a gift card number or code, a prepaid card number or code, a user name, an expiration date, a CVV (card verification value), a dCVV (dynamic card verification value), a CVV2 (card verification value 2), a CVC3 (card verification code), etc. An example of a PAN is a 16-digit number, such as "4147 0900 0000 1234". In some non-limiting embodiments or aspects, credentials may be considered sensitive information.

An "authorization request message" may be an electronic message that requests authorization for an interaction. In some non-limiting embodiments or aspects, it is sent to a transaction processing computer and/or an issuer of a payment card to request authorization for a transaction. An authorization request message according to some non-limiting embodiments or aspects may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV, a dCVV, a PAN, a payment token, a username, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction-processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some non-limiting embodiments or aspects, a portable device.

A "merchant" may typically be an entity that engages in transactions and can sell goods or services or provide access to goods or services.

An "acquirer" may typically be a business entity (e.g., a commercial bank) that has a business relationship with a particular merchant or other entity. Some entities can perform both issuer and acquirer functions. Some non-limiting embodiments or aspects may encompass such single entity issuer-acquirers. An acquirer may operate an acquirer computer, which can also be generically referred to as a "transport computer".

A "network computer" may refer to a computer or a network of computers that processes transactions. In some non-limiting embodiments or aspects, the network computer can be in an electronic system used to accept, transmit, or process transactions made by user devices for money, goods, services, or access to locations or data. The network computer may transfer information and funds among issuers, acquirers, transacting parties, and users. An example of the network computer may include a payment processing server computer such as VisaNet®, operated by Visa®. Payment processing server computers such as VisaNet® are able to process credit card transactions, debit card transactions, and other types of commercial transactions. VisaNet®, in particular includes a Visa Integrated Payments (VIP) system which processes authorization requests and a Base II system which performs clearing and settlement services. In some non-limiting embodiments or aspects, a network computer can be a collection of computers that can allow access to a person seeking to access a particular location. In some non-limiting embodiments or aspects, a network computer can be a collection of computers that can allow access to specific types of data (e.g., governmental agencies).

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "payment platform" may refer to an environment which has multiple abstraction levels, a computer architecture and one or more hardware and software tools for enabling a transaction between two parties. The payment platform mostly provides one or more Application Program Interface (API) to issuers, acquirers and merchants on various transaction parameters. The payment platform has one or more services that can be subscribed by other stakeholders in the payment ecosystem for facilitating a transaction. The services may be related to user identity management, loyalty and offers management, risk and fraud mitigation, authentication services, processing services, on-behalf authorization, and the like. One such example of the payment platform is VisaNet® owned and operated by Visa Inc. which enables money transfer from one account to another account along with a host of other services mentioned above.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Some non-limiting embodiments or aspects of the present disclosure provide a system and method for interactive offer redemption. The system and method disclosed strives towards increasing user engagement with loyalty programs and encourage spending through gamification, and reward when the users exhibit desired behaviors set by the merchants. This is achieved by interfacing an external game device with an access device located at the merchant location. The user engages with the external game device and based on the user interaction level on the external game device, an offer is provided to the user which can be redeemed at the access device located at the merchant location. The user may transact with the merchant to avail/redeem the offer. The access device is connected with a connected accessory kit which is configured to set the offer details and also map the interaction level of the user with the offer that can be availed by the user. In accordance with some non-limiting embodiments or aspects of the present disclosure, the external game device and the connected accessory kit is configured to communicate with each other using one or more communication protocols. Further, the connected accessory kit is connected with the access device, and hence when the user transacts with the access device, the offer is redeemed based on the user interaction level with the external game device. The connection between the access device and the connected accessory kit may be in a wired or a wireless form.

FIG. 1 is a block diagram of a system for interactive offer redemption using an access device, in accordance with some non-limiting embodiments or aspects. FIG. 1 illustrates an interactive environment system 100 where the merchant can increase user engagement by specifying and engaging the users to take part in the loyalty programs in a gamified manner, according to some non-limiting embodiments or aspects.

In some non-limiting embodiments or aspects, interactive environment system 100 includes an external game device 102, an access device 104 and a connected accessory kit 106. In some non-limiting embodiments or aspects, external game device 102, access device 104 and connected accessory kit 106 are co-located in a merchant location. External game device 102 is a device configured to engage the users with one or more interactions to initiate a participation in a loyalty program. The user may participate in the loyalty program if he satisfies one or more rules set by the loyalty program organizer. The loyalty program organizer may be a merchant, an issuer, a card network provider and the like. External game device 102 may be either a customized device built for the specific purpose of engaging the user in the loyalty program or an off-the-shelf device which is built for a gaming purpose but can be used for loyalty programs. External game device 102 includes one or more hardware and software required for providing a gaming experience and also one or more communication ports required for communicating with external devices. One such external device may be the connected accessory kit 106 attached to access device 104.

In some non-limiting embodiments or aspects, interactive environment system 100 includes access device 104. As described in the above sections, access device 104 is a device used for accepting electronic payments from the user. In some non-limiting embodiments or aspects, an example of the access device 104 is a point-of-sale (POS) device which is present at the merchant location. Access device 104 is configured to accommodate and communicate with a plurality of components including, but not limited to a display, one or more ports to accommodate one or more connected accessories, a scanner, a Magnetic Stripe Reader (MSR), a cash drawer, a check reader, a scale, a label maker, a thermal receipt printer, an impact printer, one or more payment terminals and a database server. When the user transacts with the merchant, the sale is entered through access device 104, which is configured to make an entry in a merchant computer and also configured to display the status of the transactions to the customer. In accordance with some non-limiting embodiments or aspects of the present disclosure, access device 104 may be a standalone device or a bundled-up device comprising a plurality of components that enable the merchant to enter the sale and obtain the transaction status from the network computer.

In some non-limiting embodiments or aspects, access device 104 is communicatively coupled with connected accessory kit 106. The connection between connected accessory kit 106 and access device 104 is achieved using one more communication protocol, including a wired or a wireless protocol. The connection is established using one or more communication protocols known in the state-of-art. In some non-limiting embodiments or aspects, connected accessory kit 106 is an Internet of Things (IoT) device configured to program and manage external game device 102. Connected accessory kit 106 is a programmable device that is configured to interface with both external game device 102 and access device 104. In some non-limiting embodiments or aspects, connected accessory kit may be a part of access device 104.

Connected accessory kit 106 is configured to receive input from external game device 102, process the input and programmed to transmit the output to access device 104. In accordance with some non-limiting embodiments or aspects of the present disclosure, connected accessory kit 106 is either of a standalone device interfacing with the access device or a built-in module of access device 104. Access device 104 may be configured through an over-the-air upgrade, such as a software upgrade or firmware update, to function as an enhanced access device which can map user interaction level to the loyalty program rule, without needing any additional hardware components.

In some non-limiting embodiments or aspects, connected accessory kit 106 is configured to receive the user interaction level from external game device 102, and then map the user interaction level with the loyalty program rules, and further configured to transmit the signals to the access device 104 that translate to loyalty points or offers. A "user interaction level" is a value that represents the value of a game outcome of the user with external game device 102 while participating in the loyalty program organized by the merchant. In some non-limiting embodiments or aspects, user interaction level may represent a game outcome received from external game device 102. External game device 102 is configured detect and quantify the user's interaction with external game device 102 into a value that will be used as user interaction level based on the loyalty program rule of the game played.

In some non-limiting embodiments or aspects, external game device 102 is configured to be a Hammer Game Device for the users to interact with it. For example, the merchant may configure external game device 102 as a Hammer Game Device. External game device 102 may have one or more sensors embedded sense and detect the user's interaction. The user interacts with the external game device 102 to avail an offer based on an interaction level. The offer or the discount that the user avails is determined based on one or more rules set by the merchant and interaction level of the user with the Hammer Game Device. The Hammer Game Device comprises one or more components including a hammer, a base pad, a scale and a converter. For example, the user participating in the game may be required to hit the base pad with the hammer and depending on the force at which the hammer is hit on the base pad, as measured by the sensors of external game device 102, the scale of external game device 102 may display a user interaction level. The Hammer Game Device may have sensors embedded on one of the components such as pressure sensor, gyroscope, accelerometer, inclinometer and the like that are programmed or configured to measure the user's interaction with the external game device 102. External game device 102 may also convert the interaction level to a machine-readable value that is transmitted or sent to connected accessory kit 106. External game device 102 may have built-in capability to convert the user's interaction to machine-readable code as a user interaction level or may use an additional device that enables the conversion of the user interaction level to a machine-readable code that can be transmitted to connected accessory kit 106 through one or more communication protocols. Examples of the communication protocols include but are not limited to HC-12 wireless communication protocol, Zigbee® communication protocol, and Radio Frequency protocol.

Further, in some non-limiting embodiments or aspects, connected accessory kit 106 is programmed or configured by the merchant to map the machine-readable code received from external game device 102 to the rules and regulations required for the user to avail the discount/offer. Further, subsequent to mapping of the machine-readable code to the rules and regulations, connected accessory kit 106 is configured to transmit the discount/offer information to access device 104. Based on the transmitted message from connected accessory kit 106, access device 104 is configured to include the discount/offer information in the authorization request message and transmit to the network computer for further processing.

The network computer (not shown in figure), as described in the above sections, is configured to accept the authorization request message originated due to a sale from the merchant and further configured to submit the authorization request message for the issuer for authorization. Here, in this case, before submitting the authorization request message for authorization, the network computer operated by organizations, such as Visa Inc., is programmed to check the eligibility of the user for participating in the loyalty program and if eligible, determine the loyalty program rules and then submit the authorization request message or authorization. Based on the determined loyalty program rules, the network computer is configured to submit the authorization request message to the authorizing entity, obtain the authorization status from the authorization entity and then respond to the merchant computer with the authorization response message, which is in-turn displayed on access device 104. In a case where a discount has to be offered to the user, the network computer is configured to deduct the discount amount and submit the remaining amount to the authorizing entity for obtaining authorization. Similarly, in a case where the user is not eligible for participating in the loyalty program, the network computer is configured not to apply any discount irrespective of what the user interaction level is. The total transaction made by the user is submitted for authorization an authorization request message. Access device 104 is further configured to append the user interaction value to the authorization request message to indicate the network to apply the offer value to the total transaction. Further, based on the response received from the authorizing entity, the network computer is configured to receive the authorization request message, determine the offer value, retrieve the authorization status and further configured to transmit the authorization status to the merchant computer which is displayed on access device 104. The display module on access device 104 displays an offer redemption status along with the authorization response received from the authorizing entity.

FIG. 2 is a table illustrating offer configuration in a connected accessory kit, in accordance with some non-limiting embodiments or aspects of the present disclosure. Table 200 is an illustration of the mapping of the user interaction level to the loyalty program rules which may be configured by the merchant according to some non-limiting embodiments or aspects. The merchant configures the connected accessory kit using one or more user interfaces that may be available for configuring. The merchant may configure one or more loyalty program rules, including but not limited to a user type, portable device type, eligibility criteria and the interaction level rules. As shown in the FIG. 2, the merchant has configured the connected accessory kit for two games, namely the Hammer Game and the Bowling Interaction game. The Hammer Game may be a game where the user hits the base pad with the hammer. Based on strength of the hit the user has hit the base pad, the user interaction level is decided. The user interaction level is decided by one or more sensors placed on the base pad. The examples of the sensors include, but are not limited to a pressure sensor, a velocity sensor or any other transducer. The loyalty rules are configured based on the user interaction level with the external game device by the merchant. As shown in table 200, the merchant has configured loyalty rules for the Hammer game. The loyalty rules configured may be discrete or may have a range. As per the example configuration depicted in table 200, the configuration is as follows: 2% off for an interaction level ranging between 1-5, 5% off for the interaction level ranging from 6-10, 10% off for the interaction level ranging from 11-15, 25% off for the interaction level ranging from 16-20. The loyalty rules may be applicable for selected merchandises that the merchant may have tagged.

In another example, the merchant has configured the connected accessory kit to map the Bowling game with the loyalty program. The user interaction level in the Bowling game may be decided based on number of knock downs of pins using a bowling ball in a single frame. The Bowl strike options can be based on the number of points the user has scored at the end of the Bowling game in one instance. The Bowl strike option can be in a range or may be a discrete value. The user interaction level in the Bowling game may be captured by using one or more sensors such as accelerometer velocity sensor, or any other form of transducer placed on the pins, bowling ball or on the bowling pathway. The Bowl Strike Option is configured by the merchant using connected accessory kit 106 and merchant may choose the best option which suits his loyalty program. The choice may be made available to the merchant either to let the merchant choose it manually or configured by connected accessory kit 106 based on one or more pre-determined attributes of either the merchant or the user. Here, when the user strikes Bowl Strike Option 1, an off of 2% is provided for the user on selected merchandise and when the user strikes the Bowl Strike Option 2, an off of 5% is provided on selected merchandise. Other offer options are disclosed in the table 200.

Figure 3:
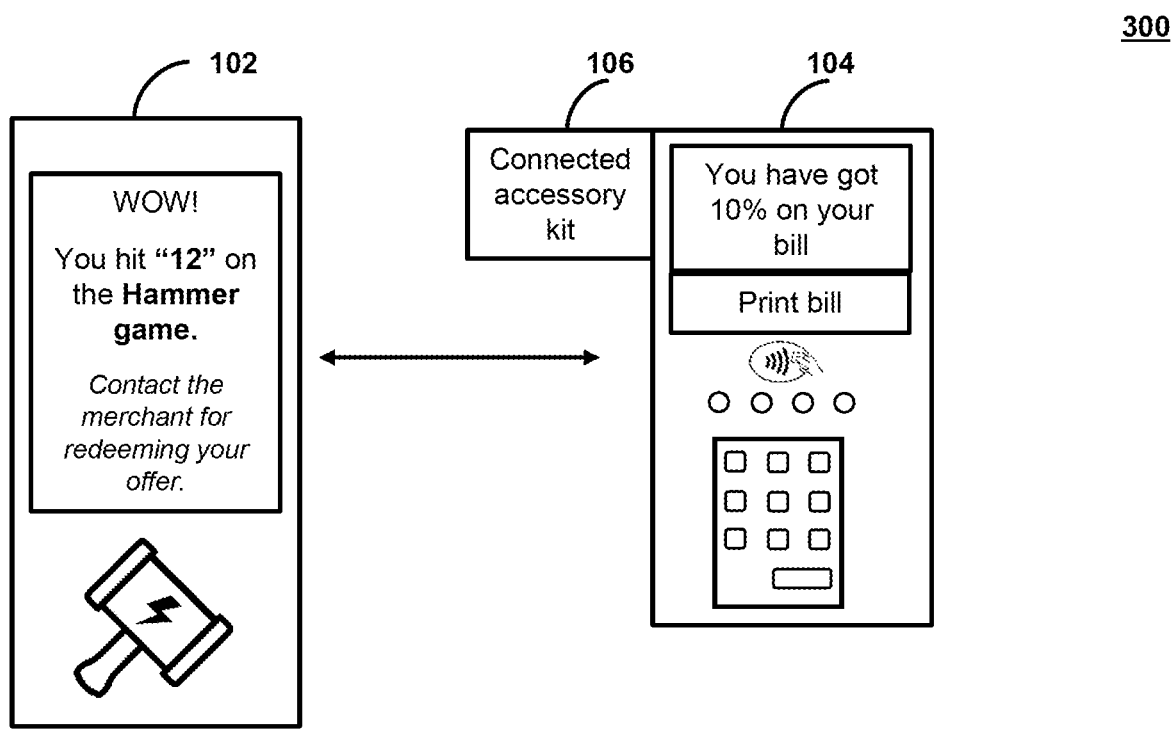
FIG. 3 is a block diagram of a system for redeeming eligible offers at a merchant location through the access device, in accordance with some non-limiting embodiments or aspects.

FIG. 3 is a block diagram of a redemption system 300 for a redeeming eligible offer at a merchant location through the access device, in accordance with some non-limiting embodiments or aspects of the present disclosure. Redemption system 300 illustrates a scenario of the user redeeming an eligible offer at the merchant location, through the access device, after interacting with the external game device. The display on external game device 102 is configured to display the loyalty points/offer earned by the user based on the user interaction level. External game device 102 is configured to transmit the user interaction level to connected accessory kit 106 in the form of machine-readable format. Connected accessory kit 106 is configured to map the user interaction level with the loyalty rules provided by the merchant and further configured to transmit the loyalty information to the access device 104. Access device 104 is configured to receive the loyalty information and further transmit the same along with the authorization request message. The network computer is programed to determine the loyalty rules and return the message to access device 102 that is configured to display the loyalty points/offers obtained by the user.

Figure 4:
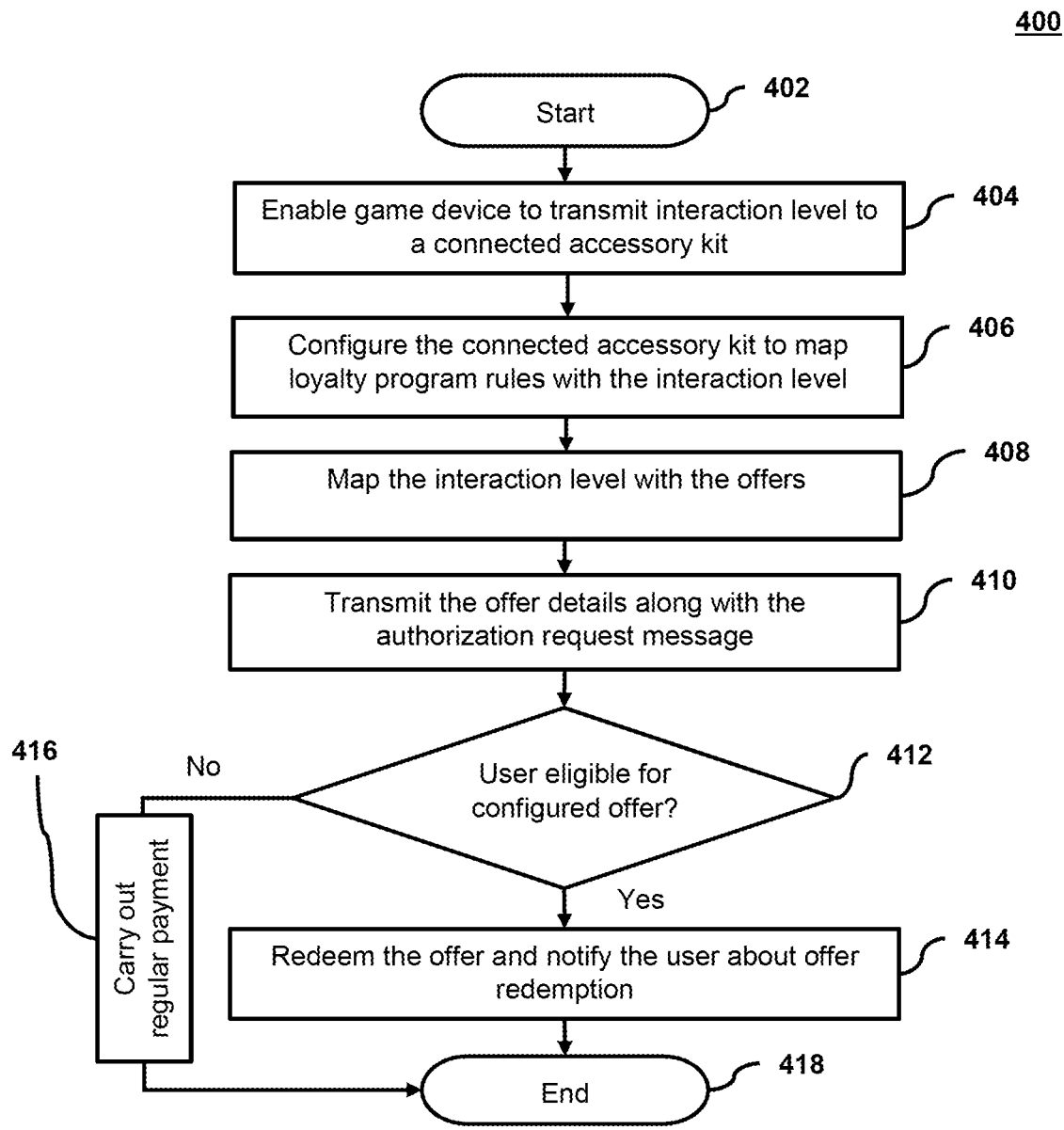
FIG. 4 is a flowchart illustrating method steps for processing offer redemption through interactive offer mechanisms, in accordance with some non-limiting embodiments or aspects.

FIG. 4 illustrates a flow diagram of an example process 400 for processing offer redemption through an interactive offer mechanism, according to some non-limiting embodiments or aspects. In some non-limiting embodiments or aspects, process 400 discloses method steps for processing transactions based on the user interaction level on an external game device. FIG. 4 is intended to disclose algorithms or functional descriptions that may be used as a basis of writing computer programs to implement the functions that are described herein, and which cause a computer to operate in the new manner that is disclosed herein. Further, FIG. 4 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 400 may be performed in any order and is not limited to the order shown in FIG. 4.

Process 400 begins at step 402. In some non-limiting embodiments or aspects, process 400 begins when the user initiates an interaction with the external game device 102 to participate in the loyalty program organized by the merchant, at the merchant location. (Step 402). The user initiation of the interaction may include, but not limited to playing the Hammer Game or playing the Bowling Game at the merchant location which is running the loyalty program. In some non-limiting embodiments or aspects, when the user initiates the interaction, like playing the Hammer Game, the game outcome is recorded as a user interaction value. In some non-limiting embodiments or aspects, the user interaction level may be detected by playing a different game. External game device 102, then transmits the user interaction value to connected accessory kit 104. In accordance with some non-limiting embodiments or aspects of the disclosure, the user interaction value is calculated based on the sensor's inbuilt logic of converting the game outcome to a user interaction level. The user interaction value represents the value for which the offer has to be calculated.

Connected accessory kit 104 is programmed to receive the user interaction value from the external game device 102 (Step 404). Connected accessory kit 104 stores the user interaction value in a memory storage and later retrieves the same for calculating the offer. In some non-limiting embodiments or aspects, connected accessory kit 104 assigns a unique tag for each user interaction value received by external game device 102, which later may be used for multiple purposes such as loyalty and offer analytics, calculating repeat customers, and the like. In accordance with some non-limiting embodiments or aspects of the present disclosure, the configuration to adapt to this process for external game device 102 and connected accessory kit 106 is done before the user starts interacting with the game.

In some non-limiting embodiments or aspects, access device 104 is configured to receive the transaction amount made by the user (Step 406) using a payment instrument. The Access device 104 is also configured to receive a plurality of information of the portable device including but not limited to the type of the portable device, mode of payment, time of payment, one or more flags enabled or disabled on the portable device and the like. Further, access device 104 is communicably coupled with the connected accessory kit 106 to retrieve the user interaction value for processing the transaction.

Further, the access device 104 is configured to determine the offer value by mapping the user interaction value with the transaction amount made by the user (Step 408). In accordance with some non-limiting embodiments or aspects of the disclosure, the access device 104 may obtain the last stored user interaction value stored in the connected accessory kit 104 to determine the offer value for the user.

Access device 104 is programmed to transmit the offer details along with the authorization request message to the network computer to be further transmitted to the issuer (Step 410). The offer details are appended as an additional field in the authorization request message that is transmitted to the network computer by access device 104 of the merchant.

Once the authorization request message is transmitted to the network computer, the network computer is configured to receive the authorization request message and initially verify and validate if the user is eligible for the configured offer (Step 412). The verification and the validation for the eligibility for the offer is determined based on a plurality of attributes including the portable device type, merchant enrollment, merchandise availability, date and time of the transaction, type of transaction, transaction amount and the like.

If the network computer determines the user is eligible for the loyalty program, then the offer is redeemed as per the loyalty program rules and the remaining amount of the transaction is transmitted for authorization (Step 414). In accordance with some non-limiting embodiments or aspects of the disclosure, the network computer is configured to subtract the amount corresponding to the offer value from the total transaction amount and then transmits rest of the transaction value to the issuer for authorization. For example, if the network computer determines that the transaction amount is $100 and the offer determined for this transaction is $10, then the amount submitted for the authorization is $90. The network computer is further programmed to notify the merchant computer about the offer amount deducted from the total transaction value.

Further, in some non-limiting embodiments or aspects, the network computer is also configured to notify the user about the offer redemption. The notification may be transmitted to the user's registered contact details such as a registered phone number or a registered email address. However, in a case where the network computer determines that the user is not eligible for loyalty program, then the network computer is configured to carry out regular transaction without including any offer details. The whole amount of the transaction is transmitted to the authorizing entity (Step 416).

The network computer is configured to transmit the authorization response message back to the access device notifying the merchant and the user about transaction status and the process ends (Step 418). In accordance with some non-limiting embodiments or aspects of the present disclosure, the authorization response message may include one or more details of the offer redemption. This authorization response message may be further used by the merchant or by the network computer for further uses such as analytics or offer conversion tracking.

In accordance with some non-limiting embodiments or aspects of the present disclosure, the computers configured by the merchant, access device, issuer systems may include a bus or other communication mechanism for addressing main memory and for transferring data between and among some non-limiting components of device. The computers may also include one or more hardware processors coupled with bus for processing information. A hardware processor may be a general-purpose microprocessor, a system on a chip (SoC), or another processor.

Main memory, such as a random access memory (RAM) or other dynamic storage device, also may be coupled to bus for storing information and software instructions to be executed by processor(s). Main memory also may be used for storing temporary variables or other intermediate information during execution of software instructions to be executed by processor(s).

Software instructions, when stored in storage media accessible to processor(s), render computers into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

The computers in the merchant systems, portable consumer device, issuer systems also may include read only memory (ROM) or other static storage device coupled to bus for storing static information and software instructions for processor(s).

One or more mass storage devices may be coupled to bus for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices (e.g., the main hard disk for the device) stores a body of program and data for directing operation of the computing device, including an operating system, user application programs, driver and other support files, as well as other data files of all sorts.

The computers may be coupled via bus to display, such as a liquid crystal display (LCD) or other electronic visual display, for displaying information to a computer user. In some configurations, a touch sensitive surface incorporating touch detection technology (e.g., resistive, capacitive, etc.) may be overlaid on display to form a touch sensitive display for communicating touch gesture (e.g., finger or stylus) input to processor(s).

An input device, including alphanumeric and other keys, may be coupled to bus for communicating information and command selections to processor. In addition to or instead of alphanumeric and other keys, input device may include one or more physical buttons or switches such as, for example, a power (on/off) button, a "home" button, volume control buttons, or the like.

Another type of user input device may be a cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Functions of the disclosed systems, methods, and modules may be performed by computing device in response to processor(s) executing one or more programs of software instructions contained in main memory. Such software instructions may be read into main memory from another storage medium, such as storage device(s). Execution of the software instructions contained in main memory cause processor(s) to perform the functions of the example embodiment(s).

While functions and operations of the example embodiment(s) may be implemented entirely with software instructions, hard-wired or programmable circuitry of computing device (e.g., an ASIC, a FPGA, or the like) may be used in some non-limiting embodiments or aspects in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device. Volatile media includes dynamic memory, such as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more software instructions to processor(s) for execution. For example, the software instructions may initially be carried on a magnetic disk or solid-state drive of a remote computer. The remote computer can load the software instructions into its dynamic memory and send the software instructions over a telephone line using a modem. A modem local to computing device can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor (s) retrieves and executes the software instructions. The software instructions received by main memory may optionally be stored on storage device(s) either before or after execution by processor(s).

The computers also may include one or more communication interface(s) coupled to bus. A communication interface provides a two-way data communication coupling to a wired or wireless network link that is connected to a local network (e.g., Ethernet network, Wireless Local Area Network, cellular phone network, Bluetooth® wireless network, or the like). Communication interface sends and receives electrical, electromagnetic, or optical signals that carry digital data streams representing various types of information. For example, communication interface may be a wired network interface card, a wireless network interface card with an integrated radio antenna, or a modem (e.g., ISDN, DSL, or cable modem).

Network link(s) typically provide data communication through one or more networks to other data devices. For example, a network link may provide a connection through a local network to a host computer or to data equipment operated by an Internet Service Provider (ISP). ISP in turn provides data communication services through the worldwide packet data communication network now commonly referred to as the "Internet". Local network(s) and Internet use electrical, electromagnetic or optical signals that carry digital data streams. The signals through some non-limiting networks and the signals on network link(s) and through communication interface(s), which carry the digital data to and from computing device, are example forms of transmission media.

The computers can send messages and receive data, including program code, through the network(s), network link(s) and communication interface(s). In the Internet example, a server might transmit a requested code for an application program through Internet, ISP, local network(s) and communication interface(s). The received code may be executed by processor as it is received, and/or stored in storage device, or other non-volatile storage for later execution.

The software systems may be employed for controlling the operation of computing device. Software system and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system is provided for directing the operation of computing device. Software system, which may be stored in system memory (RAM) and on fixed storage (e.g., hard disk or flash memory), includes a kernel or operating system (OS).

The OS manages low-level aspects of computer operation, including managing execution of processes, memory allocation, file input and output (I/O), and device I/O. One or more application programs, may be "loaded" (e.g., transferred from fixed storage into memory) for execution by the system. The applications or other software intended for use on device may also be stored as a set of downloadable computer-executable instructions, for example, for downloading and installation from an Internet location (e.g., a Web server, an app store, or other online service).

Software systems include a graphical user interface (GUI) for receiving user commands and data in a graphical (e.g., "point-and-click" or "touch gesture") fashion. These inputs, in turn, may be acted upon by the system in accordance with instructions from operating system and/or application(s). The GUI also serves to display the results of operation from the OS and application(s), whereupon the user may supply additional inputs or terminate the session (e.g., log off).

In accordance with some non-limiting embodiments or aspects of the present disclosure, the authentication module can execute programs directly on the bare hardware. Alternatively, a hypervisor or virtual machine monitor (VMM) may be interposed between the bare hardware and the operating system of the authentication module. In this configuration, VMM acts as a software "cushion" or virtualization layer between the OS and the bare hardware of the authentication module.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in non-limiting embodiments or aspects. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present disclosure have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method comprising:
capturing, by one or more sensors of an external game device of a merchant at a merchant location, a user interaction level within a range of user interaction values based on sensor data received from the one or more sensors embedded on the external game device, wherein the one or more sensors detect a user's interaction with the external game device, wherein the user is a customer of the merchant, and wherein the external game device comprises a customized device built for a gaming purpose;
receiving, by a connected accessory kit of the merchant at the merchant location separate from the external game device, a user interaction value from the external game device, the user interaction value corresponding to the user interaction level captured with the one or more sensors embedded on the external game device, wherein the connected accessory kit communicates with the external game device via a first communication protocol;
mapping, by the connected accessory kit of the merchant at the merchant location, the user interaction value to a loyalty program rule based on a predefined mapping of a plurality of user interaction values comprising the user interaction value to a plurality of loyalty program rules comprising the loyalty program rule;
receiving, by a point-of-sale (POS) terminal of the merchant at the merchant location separate from the external game device, the user interaction value, the loyalty program rule, and a transaction amount corresponding to a transaction made by the user with the merchant associated with the POS terminal communicatively coupled to the connected accessory kit, wherein the connected accessory kit is a standalone device separate from the POS terminal and is communicatively coupled to the POS terminal via a second communication protocol;

determining, by the POS terminal of the merchant at the merchant location, an offer value corresponding to the mapping of the user interaction value to the loyalty program rule, wherein determining the offer value comprises:

mapping the user interaction value with the transaction amount made by the user with the merchant; and applying the loyalty program rule corresponding to the user interaction value to the transaction amount to provide the offer value and an updated transaction amount;

transmitting, by the POS terminal of the merchant at the merchant location, an authorization request message comprising the updated transaction amount, for receiving an authorization response from an authorizing entity;

receiving, by the POS terminal of the merchant at the merchant location, the authorization response for the authorization request message; and displaying, by the POS terminal of the merchant at the merchant location, the authorization response and an offer redemption status on a display module of the POS terminal.

2. The method of claim 1, wherein the offer value is configured by the POS terminal of the merchant, and wherein the offer value is determined based on one or more factors comprising at least one of the following: user type, portable device type, eligibility criteria, interaction level rules, or any combination thereof.

3. The method of claim 1, wherein the POS terminal is configured to display an offer value corresponding to the user interaction level after the user has interacted with the external game device.

4. The method of claim 1, wherein the POS terminal is configured to transmit the offer value as a part of the authorization request message.

5. The method of claim 1, wherein the connected accessory kit is configured to store the user interaction value and transmit the user interaction value to the POS terminal when the POS terminal receives the transaction amount.

6. The method of claim 5, wherein the POS terminal is configured to obtain a last stored user interaction value and append the user interaction value in the authorization request message.

7. The method of claim 1, wherein the authorization response message comprises at least an authorization status of the transaction and an offer redemption status corresponding to the offer value.

8. An interactive offer redemption system comprising:

an external game device of a merchant at a merchant location, the external game device comprising a customized device built for a gaming purpose comprising one or more sensors embedded on the external game device, the external game device configured to:

capture a user interaction level within a range of user interaction levels based on sensor data received from the one or more sensors embedded on the external game device, wherein the one or more sensors detect a user's interaction with the external game device, wherein the user is a customer of the merchant;

a connected accessory kit of the merchant at the merchant location, the connected accessory kit being separate from the external game device and communicatively coupled to the external game device via a first communication protocol, the connected accessory kit configured to:

receive a user interaction value from the external game device, the user interaction value corresponding to the user interaction level captured with the one or more sensors embedded on the external game device; and map the user interaction value to a loyalty program rule based on a predefined mapping of a plurality of user interaction values comprising the user interaction value to a plurality of loyalty program rules comprising the loyalty program rule; and a point-of-sale (POS) terminal of the merchant at the merchant location, the POS terminal being separate from the external game device, wherein the connected accessory kit is a standalone device separate from the POS terminal and is communicatively coupled to the POS terminal via a second communication protocol, the POS terminal configured to:

receive the user interaction value, the loyalty program rule, and a transaction amount corresponding to a transaction made by the user with the merchant associated with the POS terminal communicatively coupled to the connected accessory kit;

determine an offer value corresponding to the mapping of the user interaction value to the loyalty program rule, wherein determining the offer value comprises:

mapping the user interaction value with the transaction amount made by the user with the merchant; and applying the loyalty program rule corresponding to the user interaction value to the transaction amount to provide the offer value and an updated transaction amount;

transmit an authorization request message comprising the updated transaction amount for receiving an authorization response from an authorizing entity;

receive the authorization response for the authorization request message; and display the authorization response on a display module of the POS terminal.

9. The system of claim 8, wherein the offer value is configured by the POS terminal of the merchant, wherein the offer value is determined based on one or more factors comprising at least one of the following: user type, portable device type, eligibility criteria, interaction level rules, or any combination thereof.

10. The system of claim 8, wherein the POS terminal is configured to display an offer value corresponding to the user interaction level after the user has interacted with the external game device.

11. The system of claim 8, wherein the POS terminal is configured to transmit the offer value as a part of the authorization request message.

12. The system of claim 8, wherein a connected accessory kit is configured to store the user interaction value initially and then transmit it to the POS terminal at a time when the POS terminal receives the transaction amount.

13. The system of claim 12, wherein the POS terminal is configured to obtain the stored user interaction value and append the user interaction value in the authorization request message.

14. The system of claim 8, wherein the authorization response message comprises at least an authorization status of the transaction and an offer redemption status corresponding to the determined offer value.

* * * * *